Nov. 26, 1935.  G. C. ROEDL  2,022,152
COMBINATION COOKER
Filed May 17, 1934
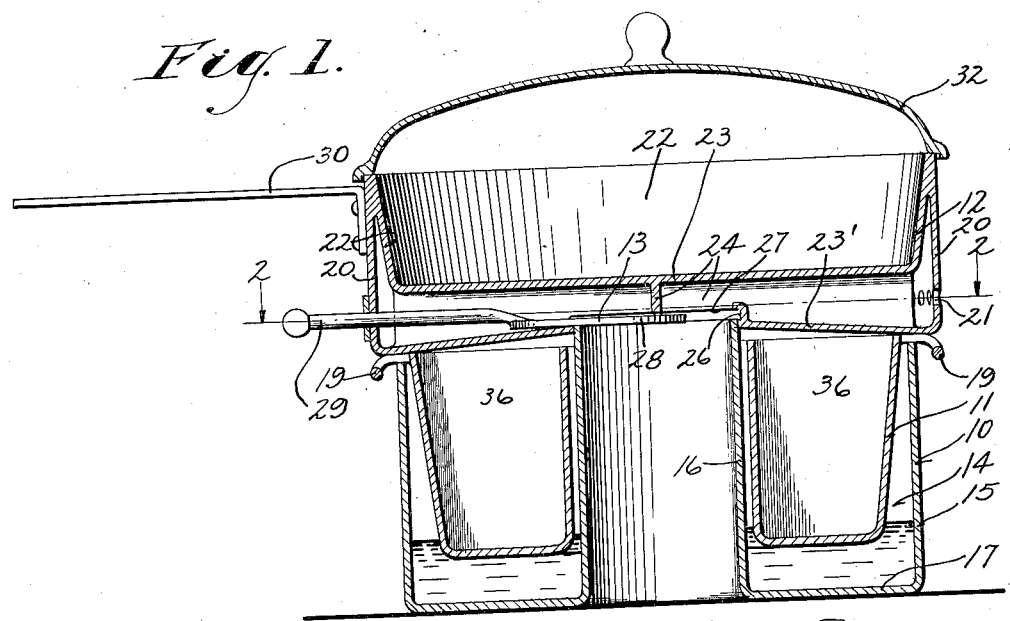
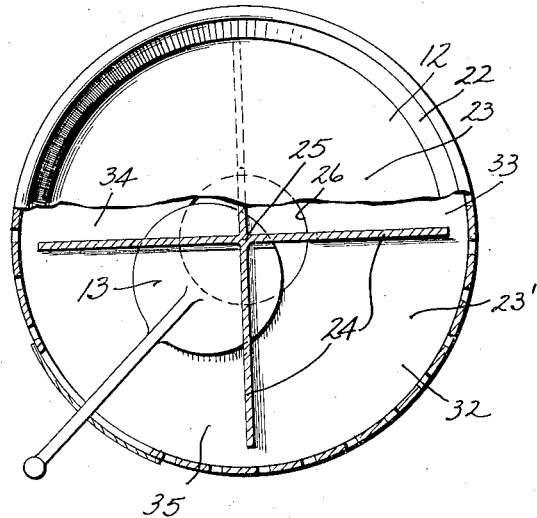
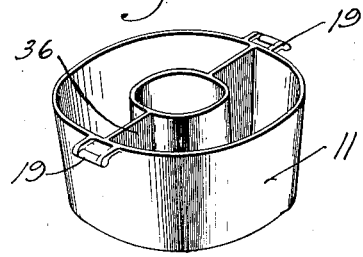
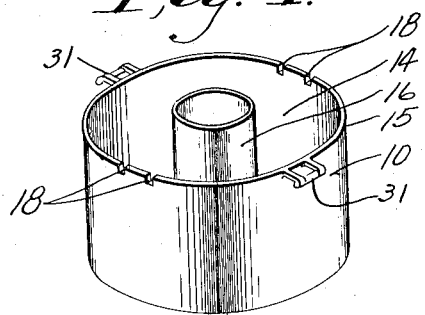
INVENTOR
George C. Roedl
BY
Wheeler, Wheeler and Wheeler
ATTORNEYS Patented Nov. 26, 1935

2,022,152

UNITED STATES PATENT OFFICE 2,022,152

COMBINATION COOKER

George C. Roedl, Beaver Dam, Wis.

Application May 17, 1934, Serial No. 726,043

3 Claims. (Cl. 53—1)

My invention relates to improvements in combination cookers.

The object of my invention is to provide in a cooking utensil, receivable upon a single burner or source of heat, facilities for the cooking of a number of types of food requiring differenting modes of heat application.

More particularly stated, it is the object of my invention to provide a cooking utensil comprising a combination of various parts for the reception of different kinds of foods, and to so provide for the application of heat to the different portions as to provide for steam cooking or boiling in one compartment and frying or braizing in another compartment, each of the compartments being provided with means for control of the relative heat applied thereto.

Another object of my invention is to provide in a combination cooker a control device for gauging relatively the heat to be applied to the various parts of the cooker.

In the drawing:

Figure 1 is a vertical section through my combination cooker, but showing the control device therefor in side elevation.

Figure 2 is a plan view of my cooker with a portion cut away upon line 2—2 of Fig. 1.

Figure 3 is a perspective of a type of utensil insertable into the steam cooking portion of my cooker.

Figure 4 is a perspective of the main supporting kettle used in my improved cooker.

Like parts are designated by the same reference characters throughout the several views.

My combination cooker includes four main parts, comprising a main supporting kettle 10, a kettle insert 11, a skillet 12, and control device 13, the skillet being provided with supporting structure to make it receivable upon the supporting kettle 10 or upon a burner. In either event, the control device 13 is in position to regulate the passage of heat to the bottom of the working surfaces of the skillet.

As shown most clearly in Figs. 1 and 4, my supporting kettle 10 provides a substantially annular cooking chamber 14 between an outer wall 15 and an inner wall 16, which may be circular or of any desired shape. The bottom 17 of the cooking chamber in the supporting kettle 10 does not extend across the area encompassed by the inner wall 16. The supporting kettle therefore, when positioned over a source of heat, as for instance, over the gas burner of an ordinary domestic gas stove, provides a passageway for hot gases upwardly inside of the circular inner wall 16, thus exposing a large area to the heated gases whereby heat may be conducted to the contents of the cooking chamber 14.

The upper margins of the outer wall 15 of the kettle 10 are notched at 18 to receive portions of handles 19 of the kettle insert 11 so that the kettle insert may be supported in the kettle 10 in the proper position to permit of steam cooking.

The skillet 12 includes a skillet skirt 20 apertured at 21 and, supported thereby, skillet walls 22 contoured in substantially conventional form in the configuration of the usual iron skillet. The bottom 23 of the skillet is provided with several radial ribs 24 on the under side thereof, and these radial ribs converge centrally at 25. The ribs 24 therefore comprise spacers between the bottom 23 of the skillet and the heater bottom 23', which is apertured centrally at 26 and which extends outwardly to merge integrally with the apertured skillet skirt of the skillet structure.

Centrally of the skillet structure the ribs 24 are cut away as indicated at 27 to provide space for the damper member 28 of the control device 13 which is receivable, in the slot formed by the cutting away of the ribs at 27, under control of a handle 29 extending through the skillet skirt 20 of the skillet structure. A conventional type handle 30 upon the skillet structure, handles 31 upon the supporting kettle 10, and a cover 32 receivable over the skillet, complete the cooker structure.

From the above description it will be apparent that the skillet structure may be placed directly over a source of heat, or the supporting kettle 10 may be placed directly over the source of heat and the skillet structure may be superimposed upon the supporting kettle. When the supporting kettle is in position under the skillet, the inner wall 16 of the supporting kettle is receivable in the aperture 26 in the heater bottom 25, thus positively positioning the skillet structure 12 upon the kettle to prevent accidental dislocation therebetween.

With my entire combination cooker structure, as shown in Fig. 1, in position over a flame, the hot gases passing upwardly toward the damper 28 are subject to control through the adjustment of the damper. For instance, if the damper is in the position shown in Fig. 2, the hot gases may pass upwardly into compartments 32, 33, and 34, but not into compartment 35 under the skillet, and the damper may be so adjusted as to permit entry of hot gases only into compartment 33. It will be obvious from the description of the skillet structure that the gases after passing into the compartments may escape through apertures 21 in the skillet skirt 20.

It is thus possible to concentrate heat under particular portions of the skillet and it is also possible to close the damper 28 entirely and concentrate heat in the walls and bottom of the supporting kettle.

Suitable partitions 36 may be provided in the annular chamber of the kettle insert 11 to provide for the simultaneous cooking of any desired number of different vegetables.

I claim:

1. The combination with a skillet provided with an apertured skirt and an apertured heater bottom extending centrally from said skirt, of a bottom for the skillet spaced from the heater bottom, radial ribs whereby to divide the space between the skillet bottom and the heater bottom into compartments, and a damper receivable across the aperture in the heater bottom whereby to control passage of hot gases into the respective compartments.

2. The combination with an annular supporting kettle with a substantially circular central wall extending upwardly beyond the height of side walls thereof, of a skillet structure receivable upon said supporting kettle and provided with a heater bottom apertured to receive the central wall of the supporting kettle, and a damper adjustably receivable across the top of the central wall.

3. The combination with a skillet, of supporting ribs for the bottom thereof dividing a plurality of segregated portions of said bottom, an apertured heater bottom in contact with said ribs and spaced from the bottom of the skillet, said aperture opening into said plurality of segregated portions, and a damper for adjustably closing the aperture, said damper being movable progressively to selectively isolate certain of said portions from heated gases receivable through the aperture.

GEORGE C. ROEDL.